(12) United States Patent
Xu et al.

(10) Patent No.: US 11,259,234 B2
(45) Date of Patent: Feb. 22, 2022

(54) PATH SWITCHING METHOD AND RELATED DEVICE

(71) Applicant: Huawei Technologies Co., Ltd., Shenzhen (CN)

(72) Inventors: Haibo Xu, Beijing (CN); Nathan Edward Tenny, San Diego, CA (US); Yiru Kuang, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 76 days.

(21) Appl. No.: 16/638,020

(22) PCT Filed: Aug. 11, 2017

(86) PCT No.: PCT/CN2017/097024
§ 371 (c)(1),
(2) Date: Feb. 10, 2020

(87) PCT Pub. No.: WO2019/028812
PCT Pub. Date: Feb. 14, 2019

(65) Prior Publication Data
US 2020/0178155 A1     Jun. 4, 2020

(51) Int. Cl.
*H04W 40/34*     (2009.01)
*H04W 40/10*     (2009.01)
(Continued)

(52) U.S. Cl.
CPC .......... *H04W 40/34* (2013.01); *H04W 40/10* (2013.01); *H04W 40/28* (2013.01); *H04W 52/08* (2013.01);
(Continued)

(58) Field of Classification Search
None
See application file for complete search history.

(56) References Cited

U.S. PATENT DOCUMENTS

2011/0151882 A1*    6/2011   Hwang ............... H04L 5/001
                                                        455/450
2015/0215981 A1    7/2015   Patil et al.
(Continued)

FOREIGN PATENT DOCUMENTS

CN     102083197 A     6/2011
CN     102118810 A     7/2011
(Continued)

OTHER PUBLICATIONS

XP051162441, R2-167108, LG Electronics Inc, "The way to obtain UL grant and TA information for RACH-less HO," 3GPP TSG-RAN WG2 Meeting #95bis, Kaohsiung, Taiwan, Oct. 10-14, 2016, 3 pages.
(Continued)

*Primary Examiner* — James P Duffy
(74) *Attorney, Agent, or Firm* — Conley Rose, P.C.

(57) ABSTRACT

A path switching method and a related device, where the method includes receiving, by a base station, a first message from a first user equipment requesting to switch the first user equipment from a non-direct path for communicating with the base station using a second user equipment to a direct path communicating with the base station, and sending, by the base station, a second message to the first user equipment instructing the first user equipment to perform path switching. The second message includes at least one of a timing advance, a closed-loop power control value or an uplink grant configuration.

20 Claims, 7 Drawing Sheets

(51) Int. Cl.
- *H04W 40/28* (2009.01)
- *H04W 52/08* (2009.01)
- *H04W 52/54* (2009.01)
- *H04W 72/04* (2009.01)
- *H04W 72/14* (2009.01)
- *H04W 88/02* (2009.01)
- *H04W 88/08* (2009.01)

(52) U.S. Cl.
CPC ....... *H04W 52/54* (2013.01); *H04W 72/0413* (2013.01); *H04W 72/0426* (2013.01); *H04W 72/14* (2013.01); *H04W 88/02* (2013.01); *H04W 88/08* (2013.01)

(56) References Cited

U.S. PATENT DOCUMENTS

| | | | |
|---|---|---|---|
| 2016/0135158 A1* | 5/2016 | Krishnamoorthy | H04L 5/0053 370/329 |
| 2017/0086252 A1 | 3/2017 | Chai et al. | |
| 2018/0295534 A1 | 10/2018 | Huang et al. | |
| 2018/0352412 A1 | 12/2018 | Huang et al. | |

FOREIGN PATENT DOCUMENTS

| | | |
|---|---|---|
| CN | 103024924 A | 4/2013 |
| CN | 105934985 A | 9/2016 |
| CN | 106211261 A | 12/2016 |
| CN | 106604336 A | 4/2017 |
| CN | 107017506 A | 8/2017 |
| WO | 2016180366 A1 | 11/2016 |
| WO | 2016188680 A1 | 12/2016 |
| WO | 2017108209 A1 | 6/2017 |

OTHER PUBLICATIONS

XP051151529, R2-167135, Qualcomm Incorporated, "Uplink Grant for RACH-less Handover," 3GPP TSG-RAN2 Meeting #95bis, Kaohsiung, Taiwan, Oct. 10-14, 2016, 3 pages.

XP050962107, S2-150787, Ericsson, "Prose UE to network Relay and Service Continuity Solution," SA WG2 Meeting #108, Apr. 13-17, 2015, San Jose Del Cabo, Mexico, 10 pages.

XP051299036, 3GPP TR 36.746 V0.6.0, "3rd Generation Partnership Project; Technical Specification Group Radio Access Network; Study on further enhancements to LTE Device to Device (D2D), User Equipment (UE) to network relays for Internet of Things (IoT) and wearables; (Release 15)," May 2017, 36 pages.

\* cited by examiner

PATH SWITCHING METHOD AND RELATED DEVICE

CROSS-REFERENCE TO RELATED APPLICATIONS

This application is a U.S. National Stage of International Patent Application No. PCT/CN2017/097024 filed on Aug. 11, 2017, which is hereby incorporated by reference in its entirety.

TECHNICAL FIELD

This application relates to the field of wireless network technologies, and in particular, to a path switching method and a related device.

BACKGROUND

Communication between user equipment (User Equipment, UE) and a base station includes two modes: Communication mode 1: The user equipment and the base station are directly connected for data communication. This communication mode is referred to as direct communication. In this case, a communication path between the user equipment and the base station is referred to as a direct path. Communication mode 2: First user equipment is connected to the base station by using second user equipment for data communication. This communication mode is referred to as non-direct communication. In this case, a communication path between the first user equipment and the base station is referred to as a non-direct path. The first user equipment is remote user equipment (Remote UE), and the second user equipment is relay user equipment (Relay UE). The remote UE may switch between two connection modes or two communication paths. For example, as shown in FIG. 1(A), when link quality between the remote UE and the base station is relatively poor, the remote UE may choose to connect to the base station by using nearby relay UE, and switch from a direct path to a non-direct path. For another example, as shown in FIG. 1(B), after the relay UE connected to the remote UE moves, it may be difficult to maintain a connection between the remote UE and the relay UE, and the remote UE needs to switch from a non-direct path to a non-direct path.

In a process in which the remote UE switches from the non-direct path to the direct path, the remote UE needs to obtain uplink synchronization of a serving cell of the direct path by using a random access process, and then communicate with the base station by using the direct path. However, in a process in which the remote UE performs random access to the base station by using the direct path, not only power consumption of the remote UE is increased, but also a service of the remote UE is interrupted especially in a case of enhanced coverage.

SUMMARY

This application provides a path switching method and a related device, so that not only service continuity can be maintained and service quality can be improved in a path switching process, but power consumption caused when remote UE performs random access can also be reduced.

According to one aspect, this application provides a path switching method, including: first, receiving, by a base station, a first message sent by first user equipment, where the first message is used to request to switch the first user equipment from a non-direct path for communicating with the base station by using second user equipment to a direct path communicating with the base station; and then, sending a second message to the first user equipment, where the second message is used to instruct the first user equipment to perform path switching, and the second message includes at least one of a timing advance, a closed-loop power control value, and an uplink grant configuration. Therefore, path switching is completed by using the foregoing information, so that service continuity is maintained, service quality is improved, and power consumption caused when the first user equipment performs random access is reduced.

In a possible design, the base station sends a third message to the second user equipment, where the third message is used to instruct the second user equipment to report the timing advance; and then receives a fourth message sent by the second user equipment, where the fourth message includes the timing advance.

In another possible design, the third message may be further used to instruct the second user equipment to report the closed-loop power control value, and the fourth message further includes a closed-loop power control value currently used by the second user equipment.

In another possible design, the base station sends a fifth message to the second user equipment, where the fifth message is used to instruct the second user equipment to report the closed-loop power control value; and then receives a sixth message sent by the second user equipment, where the sixth message includes the closed-loop power control value.

In another possible design, the first message further includes link quality of a current short-range communication link between the first user equipment and the second user equipment.

In another possible design, a short-range link connection between the first user equipment and the second user equipment may be a connection of any technology in a sidelink, Bluetooth, and a WLAN based on a 3rd generation partnership project (3rd Generation Partnership Project, 3GPP).

In another possible design, the base station receives a radio resource control (Radio Resource Control, RRC) connection reconfiguration complete message sent by the first user equipment, and the radio resource control connection reconfiguration complete message is sent by the first user equipment based on at least one of the timing advance, the closed-loop power control value, and the uplink grant configuration.

In another possible design, after receiving the first message sent by the first user equipment, the base station determines whether current link quality between the first user equipment and the second user equipment is greater than a preset threshold; and if the current link quality is greater than the preset threshold, the base station sends the third message to the second user equipment; or if the current link quality is not greater than the preset threshold, the base station does not perform any processing.

Another aspect of this application provides a path switching method, including: sending, by first user equipment, a first message to a base station, where the first message is used to request to switch the first user equipment from a non-direct path for communicating with the base station by using second user equipment to a direct path for communicating with the base station; then, receiving a second message sent by the base station, where the second message includes at least one of a timing advance, a closed-loop power control value, and an uplink grant configuration; and performing, by the first user equipment, path switching based on the second message. Therefore, path switching is completed by using the foregoing information, so that service continuity is maintained, service quality is improved, and power consumption caused when the first user equipment performs random access is reduced.

In a possible design, after performing path switching based on the second message, the first user equipment sends a radio resource control connection reconfiguration complete message to the base station based on at least one of the timing advance, the closed-loop power control value, and the uplink grant configuration.

In another possible design, the first user equipment may adjust, based on a value of the timing advance delivered by the base station, a timing advance of a sent uplink physical signal including a physical uplink shared channel to ensure synchronization with the base station, or determine transmit power of a physical uplink shared channel based on the closed-loop power control value delivered by the base station, or determine a sending resource of a physical uplink shared channel (Physical Uplink Shared Channel, PUSCH) based on the uplink grant configuration delivered by the base station. After the foregoing processing, the first user equipment may communicate with the base station by using the direct path.

Another aspect of this application provides a path switching method, including: receiving, by second user equipment, a third message sent by a base station, where the third message is used to instruct the second user equipment to report a timing advance; and then sending a fourth message to the base station, where the fourth message includes the timing advance of the second user equipment. Therefore, the base station obtains the timing advance to complete path switching.

In a possible design, the second user equipment receives a fifth message sent by the base station, where the fifth message is used to instruct the second user equipment to report a closed-loop power control value; and then sends a sixth message to the base station, where the sixth message includes the closed-loop power control value.

In another possible design, the third message may be further used to instruct the second user equipment to report a closed-loop power control value, and the fourth message further includes a closed-loop power control value currently used by the second user equipment.

Another aspect of this application provides a path switching method, including: receiving, by a base station, a first message sent by second user equipment, where the first message is used to request to release a link connection between the second user equipment and first user equipment; and then, sending a second message to the first user equipment, where the second message is used to instruct the first user equipment to switch from a non-direct path for communicating with the base station by using the second user equipment to a direct path for communicating with the base station, and the second message includes at least one of a timing advance, a closed-loop power control value, and an uplink grant configuration. Therefore, path switching is completed by using the foregoing information, so that service continuity is maintained, service quality is improved, and power consumption caused when the first user equipment performs random access is reduced.

In a possible design, the first message includes the timing advance of the second user equipment.

In another possible design, the first message further includes the closed-loop power control value of the second user equipment.

In another possible design, after sending the second message to the first user equipment, the base station receives a radio resource control connection reconfiguration complete message sent by the first user equipment, and the radio resource control connection reconfiguration complete message is sent by the first user equipment based on at least one of the timing advance, the closed-loop power control value, and the uplink grant configuration.

Another aspect of this application provides a path switching method, including: first, receiving, by first user equipment, a second message sent by a base station, where the second message is sent by the base station after the base station receives a first message sent by second user equipment, the first message is used to request to release a link connection between the second user equipment and the first user equipment, and the second message includes at least one of a timing advance, a closed-loop power control value, and an uplink grant configuration; and then, switching, based on the second message, from a non-direct path for communicating with the base station by using the second user equipment to a direct path for communicating with the base station. Therefore, path switching is completed by using the foregoing information, so that service continuity is maintained, service quality is improved, and power consumption caused when the first user equipment performs random access is reduced.

In a possible design, the first message includes the timing advance of the second user equipment.

In another possible design, the first message further includes the closed-loop power control value of the second user equipment.

In another possible design, after switching, based on the second message, from the non-direct path for communicating with the base station by using the second user equipment to the direct path for communicating with the base station, the first user equipment sends a radio resource control connection reconfiguration complete message to the base station based on at least one of the timing advance, the closed-loop power control value, and the uplink grant configuration.

In another possible design, the first user equipment may adjust, based on a value of the timing advance delivered by the base station, a timing advance of a sent uplink physical signal including a physical uplink shared channel to ensure synchronization with the base station, or determine transmit power of a physical uplink shared channel based on the closed-loop power control value delivered by the base station, or determine a sending resource of a physical uplink shared channel based on the uplink grant configuration delivered by the base station. After the foregoing processing, the first user equipment may communicate with the base station by using the direct path.

Another aspect of this application provides a path switching method, including: first, receiving, by a base station, a first message sent by first user equipment, where the first message is used to request to switch the first user equipment from a non-direct path for communicating with the base station by using second user equipment to a direct path for communicating with the base station; and after the first user equipment obtains a timing advance and/or a closed-loop power control value from the second user equipment, sending, by the base station, a fourth message to the first user equipment, where the fourth message includes an uplink grant configuration and/or the closed-loop power control value. Therefore, path switching is completed by using the foregoing information, so that service continuity is maintained, service quality is improved, and power consumption caused when the first user equipment performs random access is reduced.

In a possible design, the first message further includes current link quality between the first user equipment and the second user equipment.

In another possible design, after receiving the first message sent by the first user equipment, the base station determines whether current link quality between the first user equipment and the second user equipment is greater than a preset threshold; and if the current link quality is greater than the preset threshold, the base station sends a third message to the second user equipment; or if the current link quality is not greater than the preset threshold, the base station does not perform any processing.

In another possible design, after sending the fourth message to the first user equipment, the base station receives a radio resource control connection reconfiguration complete message sent by the first user equipment, and the radio resource control connection reconfiguration complete message is sent by the first user equipment based on at least one of the timing advance, the closed-loop power control value, and the uplink grant configuration.

Another aspect of this application provides a path switching method, including: sending, by first user equipment, a first message to a base station, where the first message is used to request to switch the first user equipment from a non-direct path for communicating with the base station by using second user equipment to a direct path for communicating with the base station; sending, by the first user equipment, a second message to the second user equipment, and receiving a third message of the second user equipment, where the third message includes a timing advance and/or a closed-loop power control value; and receiving, by the first user equipment, a fourth message sent by the base station, where the fourth message includes an uplink grant configuration and/or the closed-loop power control value. Therefore, path switching is completed by using the foregoing information, so that service continuity is maintained, service quality is improved, and power consumption caused when the first user equipment performs random access is reduced.

In a possible design, the first user equipment may send the first message, receive the fourth message, send the second message, and receive the third message in any sequence. For example, the first user equipment may first send the first message, and send the second message before receiving the fourth message. For another example, the first user equipment may first send the first message, and send the second message after receiving the fourth message. For another example, the first user equipment may first send the second message, and send the first message before receiving the third message. For another example, the first user equipment may first send the second message, and send the first message after receiving the third message.

In another possible design, the first user equipment may adjust, based on a value of the timing advance delivered by the second user equipment, a timing advance of a sent uplink physical signal including a physical uplink shared channel to ensure synchronization with the base station, or determine transmit power of a physical uplink shared channel based on the closed-loop power control value sent by the base station or the second user equipment, or determine a sending resource of a physical uplink shared channel based on the uplink grant configuration delivered by the base station. After the foregoing processing, the first user equipment may communicate with the base station by using the direct path.

In another possible design, the first user equipment sends a radio resource control connection reconfiguration complete message to the base station based on at least one of the timing advance, the closed-loop power control value, and the uplink grant configuration.

Another aspect of this application provides a path switching method, including: receiving, by a base station, a second message sent by first user equipment, where the second message is used to request to switch the first user equipment from a non-direct path for communicating with the base station by using second user equipment to a direct path for communicating with the base station; and then, sending a third message to the first user equipment, where the third message includes an uplink grant configuration. Therefore, path switching is completed by using the foregoing information, so that service continuity is maintained, service quality is improved, and power consumption caused when the first user equipment performs random access is reduced.

In a possible design, after sending the third message to the first user equipment, the base station receives a radio resource control connection reconfiguration complete message sent by the first user equipment, and the radio resource control connection reconfiguration complete message is sent by the first user equipment based on at least one of a timing advance, a closed-loop power control value, and the uplink grant configuration.

Another aspect of this application provides a path switching method, including: first, receiving, by first user equipment, a first message sent by second user equipment, where the first message includes a timing advance and/or a closed-loop power control value; then, sending a second message to a base station; and after receiving the second message, returning, by the base station, a third message to the first user equipment, where the third message includes an uplink grant configuration and/or the closed-loop power control value. Therefore, path switching is completed by using the foregoing information, so that service continuity is maintained, service quality is improved, and power consumption caused when the first user equipment performs random access is reduced.

In a possible design, the first user equipment sends a radio resource control connection reconfiguration complete message to the base station based on the uplink grant configuration.

In another possible design, the first user equipment may adjust, based on a value of the timing advance delivered by the second user equipment, a timing advance of a sent uplink physical signal including a physical uplink shared channel to ensure synchronization with the base station, or determine transmit power of a physical uplink shared channel based on the closed-loop power control value sent by the base station or the second user equipment, or determine a sending resource of a physical uplink shared channel based on the uplink grant configuration delivered by the base station. After the foregoing processing, the first user equipment may communicate with the base station by using a direct path.

In another possible design, the second message includes indication information, and the indication information is used to indicate that the first user equipment has obtained the timing advance or indicate that the first user equipment has obtained the timing advance and the closed-loop power control value.

Another aspect of this application provides a base station, where the base station is configured to implement methods and functions performed by the base station in the foregoing aspects, and is implemented by hardware/software, and the hardware/software of the base station includes units corresponding to the foregoing functions.

Another aspect of this application provides first user equipment, where the first user equipment is configured to implement methods and functions performed by the first user equipment in the foregoing aspects, and is implemented by hardware/software, and the hardware/software of the first user equipment includes units corresponding to the foregoing functions.

Another aspect of this application provides second user equipment, where the first user equipment is configured to implement methods and functions performed by the second user equipment in the foregoing aspects, and is implemented by hardware/software, and the hardware/software of the second user equipment includes units corresponding to the foregoing functions.

Another aspect of this application provides a base station, including a processor, a memory, and a communications bus, where the communications bus is configured to implement connection and communication between the processor and the memory, and the processor executes a program stored in the memory to implement steps in the path switching method provided in the foregoing aspects.

Another aspect of this application provides first user equipment, including a processor, a memory, and a communications bus, where the communications bus is configured to implement connection and communication between the processor and the memory, and the processor executes a program stored in the memory to implement steps in the path switching method provided in the foregoing aspects.

Another aspect of this application provides second user equipment, including a processor, a memory, and a communications bus, where the communications bus is configured to implement connection and communication between the processor and the memory, and the processor executes a program stored in the memory to implement steps in the path switching method provided in the foregoing aspects.

In a possible design, the base station provided in this application may include modules corresponding to behavior of a network device in the foregoing method designs. The modules may be software and/or hardware.

In a possible design, the first user equipment provided in this application may include modules corresponding to behavior of a terminal in the foregoing method designs. The modules may be software and/or hardware.

In a possible design, the second user equipment provided in this application may include modules corresponding to behavior of a terminal in the foregoing method designs. The modules may be software and/or hardware.

Another aspect of this application provides a computer readable storage medium, where the computer readable storage medium stores an instruction, and when the instruction runs on a computer, the computer is enabled to perform the methods according to the foregoing aspects.

Another aspect of this application provides a computer program product including an instruction, and when the instruction runs on a computer, the computer is enabled to perform the methods in the foregoing aspects.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

The following describes the embodiments of this application with reference to the accompanying drawings in the embodiments of this application.

Figure 1A:
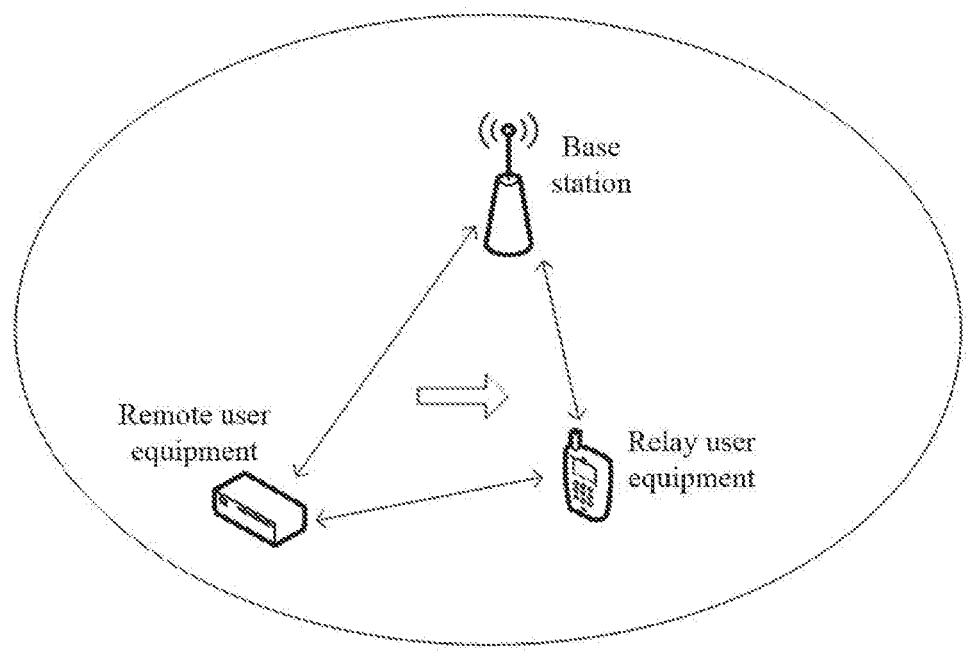
FIG. 1(A) is a schematic diagram of path switching according to a solution in the prior art.
Figure 1B:
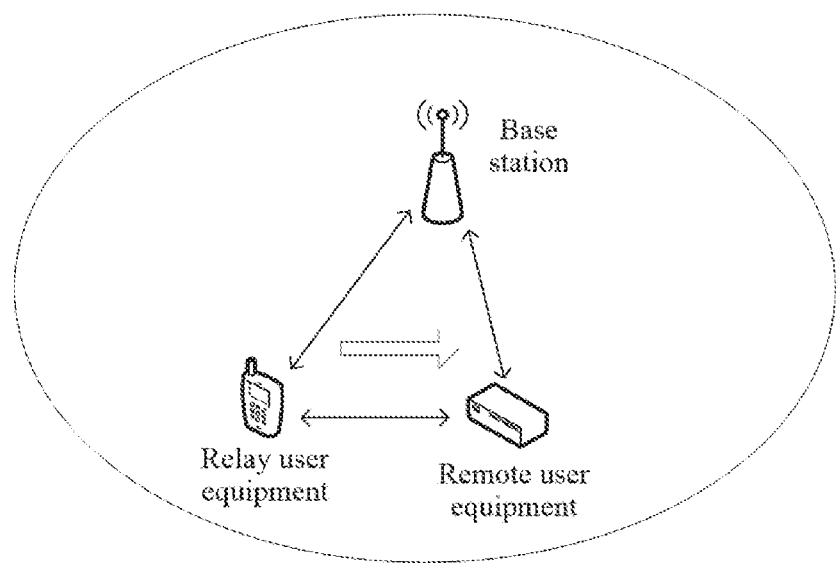
FIG. 1(B) is a schematic diagram of another path switching according to a solution in the prior art.
Figure 2:
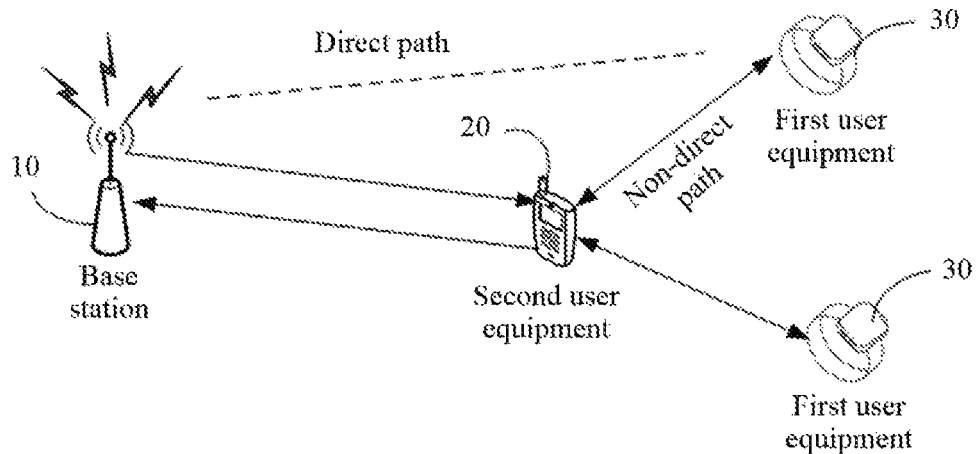
FIG. 2 is a schematic structural diagram of a path switching system according to an embodiment of this application.

FIG. 2 is a schematic structural diagram of a path switching system according to an embodiment of this application. The path switching system includes first user equipment, second user equipment, and a base station, where the first user equipment is remote user equipment, and the second user equipment is relay user equipment. The first user equipment may communicate with the base station by using the second user equipment, or may directly communicate with the base station. The first user equipment or the second user equipment in the embodiments of this application may be any device that has a wireless transmitting/receiving function, may be a device that provides a voice and/or a data connection for a user, may be a computing device connected to a laptop computer, a desktop computer, or the like, or may be a stand-alone device such as a personal digital assistant (Personal Digital Assistant, PDA). The first user equipment or the second user equipment may be further referred to as a system, a subscriber unit, a user station, a mobile station, a mobile station, a remote station, an access point, a remote terminal, an access terminal, a user terminal, a user agent, or a user apparatus. The base station in this embodiment of this application may be an access point, a NodeB, an evolved NodeB (Environment Bureau, eNB), or a 5G base station (Next generation base station, gNB) that is a device, in an access network, that communicates with a wireless terminal on an air interface by using one or more sectors. By converting a received air interface frame into an IP packet, the base station may serve as a router between the wireless terminal and a remaining part of the access network, and the access network may include an Internet Protocol network. The base station may further coordinate attribute management for the air interface.

Figure 3:
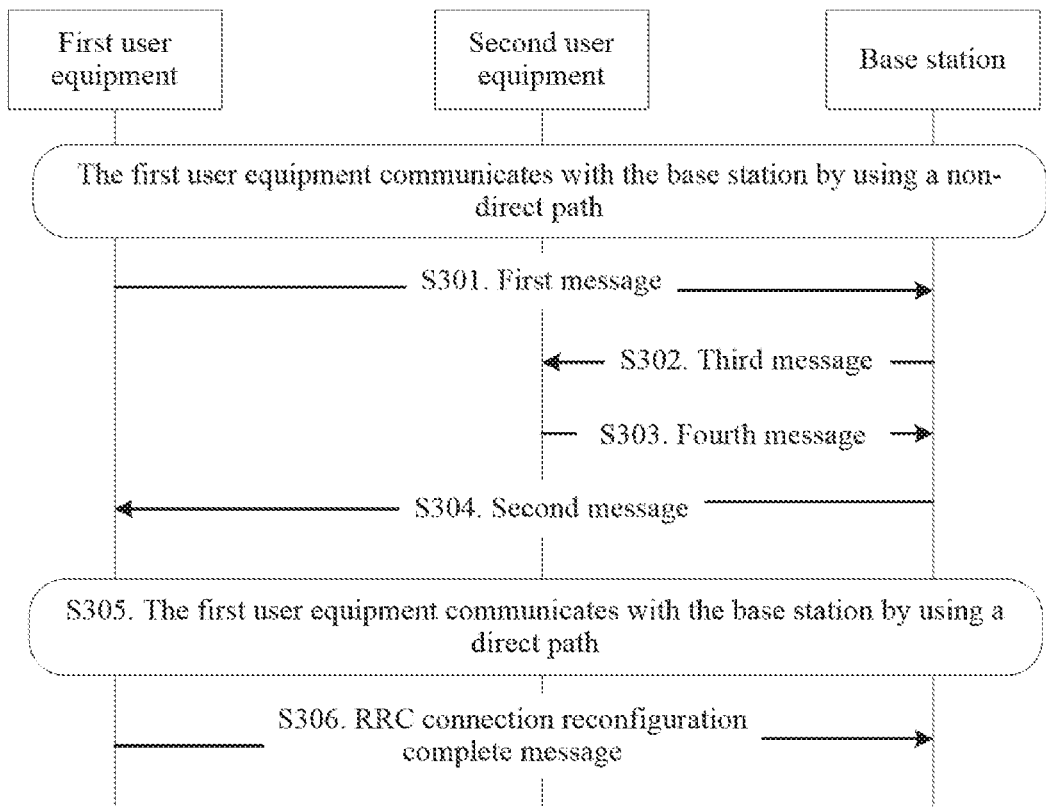
FIG. 3 is a schematic flowchart of a path switching method according to an embodiment of this application.

FIG. 3 is a schematic flowchart of a path switching method according to an embodiment of this application. The method includes but is not limited to the following steps.

S301. First user equipment communicates with a base station by using second user equipment, where the first user equipment and the second user equipment are connected by using a short-range link by using any one of a sidelink of 3GPP, a wireless local area networks (Wireless Local Area Networks, WLAN), and Bluetooth. After the first user equipment or the second user equipment starts to move, the link between the first user equipment and the second user equipment cannot be maintained. The first user equipment may send a first message to the base station, where the first message is used to request to switch the first user equipment from a non-direct path for communicating with the base station by using the second user equipment to a direct path for communicating with the base station.

Optionally, the first message further includes current link quality between the first user equipment and the second user equipment.

S302. The base station sends a third message to the second user equipment. The third message may be used to instruct the second user equipment to report a timing advance. Optionally, the third message may be further used to instruct the second user equipment to report a closed-loop power control value.

Optionally, after receiving the first message sent by the first user equipment, the base station determines whether the current link quality between the first user equipment and the second user equipment is greater than a preset threshold; and if the current link quality is greater than the preset threshold, the base station sends the third message to the second user equipment; or if the current link quality is not greater than the preset threshold, the base station does not perform any processing. The first user equipment can use the timing advance of the second user equipment only when the link quality between the first user equipment and the second user equipment is relatively good.

S303. The second user equipment sends a fourth message to the base station, where the fourth message includes the timing advance. Optionally, the fourth message further includes a closed-loop power control value currently used by the second user equipment. The timing advance may include an uplink timing advance currently used by the second user equipment, and a length is 11 bits; or may include a receive-transmit time difference (RX_TX time difference) that is of user equipment for a signal frame and that is currently measured by the second user equipment, and a length is 12 bits.

In a possible implementation, the third message and the fourth message may be RRC messages, the third message may be a request message, and the fourth message is a response message. For example, the third message may be a UE information request message, and the fourth message may be a UE information response message.

Figure 4A:
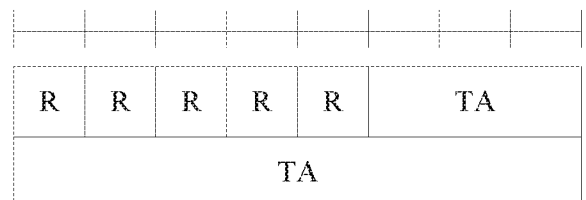
FIG. 4(A) is a schematic diagram of a MAC CE format according to an embodiment of this application.
Figure 4B:
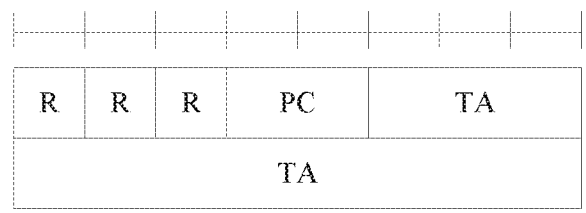
FIG. 4(B) is a schematic diagram of another MAC CE format according to an embodiment of this application.

In another possible implementation, the third message and the fourth message may be media access control control elements (Media Access Control-Control Element, MAC CE). The third message is a MAC CE that includes only one MAC subheader. The MAC subheader includes a value of a predefined logical channel identifier (Logical Channel Identify, LCID). The value of the LCID is used to indicate that the MAC CE is a MAC CE that requests the second user equipment to report the timing advance. Alternatively, the value of the LCID is used to indicate that the MAC CE is a MAC CE that requests the second user equipment to report the timing advance and the closed-loop power control value. FIG. 4(A) is a schematic diagram of a MAC CE format of a fourth message according to an embodiment of this application. The fourth message includes only the timing advance (Timing Advance, TA) of the second user equipment. FIG. 4(B) is a schematic diagram of a MAC CE format of another fourth message according to an embodiment of this application. The fourth message includes the timing advance and the closed-loop power control (Power Control, PC) value of the second user equipment. FIG. 4(A) and FIG. 4(B) are described by using an example in which the timing advance is 11 bits, or the timing advance may be extended to 12 bits.

In another possible implementation, the third message is a physical downlink control channel (Physical Downlink Control Channel, PDCCH) order, and the fourth message is a MAC CE. A value of a physical random access channel (Physical Random Access Channel, PRACH) mask index (Mask Index) included in the PDCCH order may be set to any one of current reserved values. When the PRACH mask index is set to the current reserved value, it indicates that the PDCCH order is used to instruct the second user equipment to report the timing advance, or to instruct the second user equipment to report the timing advance and the closed-loop power control value, and is not used to trigger the second user equipment to perform random access. FIG. 4(A) is a schematic diagram of a MAC CE format of a fourth message according to an embodiment of this application. The fourth message includes only the timing advance of the second user equipment. FIG. 4(B) is a schematic diagram of a MAC CE format of another fourth message according to an embodiment of this application. The fourth message includes the timing advance and the closed-loop power control value of the second user equipment. FIG. 4(A) and FIG. 4(B) are described by using an example in which the timing advance is 11 bits, or the timing advance may be extended to 12 bits.

Optionally, the base station may send a fifth message to the second user equipment, where the fifth message is used to instruct the second user equipment to report the closed-loop power control value; and then receive a sixth message sent by the second user equipment, where the sixth message includes the closed-loop power control value. The fifth message and the sixth message may separately use same signaling designs as the third message and the fourth message.

S304. The base station sends a second message to the first user equipment, where the second message is used to instruct the first user equipment to perform path switching, and the second message includes at least one of the timing advance, the closed-loop power control value, and an uplink grant configuration.

S305. The first user equipment performs path switching based on the second message.

During specific implementation, the first user equipment may adjust, based on a value of the timing advance delivered by the base station, a timing advance of a sent uplink physical signal including a physical uplink shared channel to ensure synchronization with the base station, or determine transmit power of a physical uplink shared channel based on the closed-loop power control value delivered by the base station, or determine a sending resource of a physical uplink shared channel based on the uplink grant configuration delivered by the base station. After the foregoing processing, the first user equipment may communicate with the base station by using the direct path.

S306. The first user equipment sends a radio resource control connection reconfiguration complete message to the base station based on at least one of the timing advance, the closed-loop power control value, and the uplink grant configuration.

Specifically, after the first user equipment switches from the non-direct path to the direct path, the base station initiates an RRC connection reconfiguration process to the second user equipment, to release a link connection between the second user equipment and the first user equipment, and reconfigure a data radio bearer between the second user equipment and the base station.

In this embodiment of this application, because the link between the first user equipment and the second user equipment cannot be maintained, the first user equipment sends the first message to the base station, to request to switch the first user equipment from the non-direct path for communicating with the base station by using the second user equipment to the direct path for communicating with the base station, and after receiving the first message, the base station returns at least one of the timing advance, the closed-loop power control value, and the uplink grant configuration to the first user equipment, so that the first user equipment completes path switching. Therefore, service continuity is maintained, service quality is improved, and power consumption caused when the first user equipment performs random access is reduced.

Figure 5:
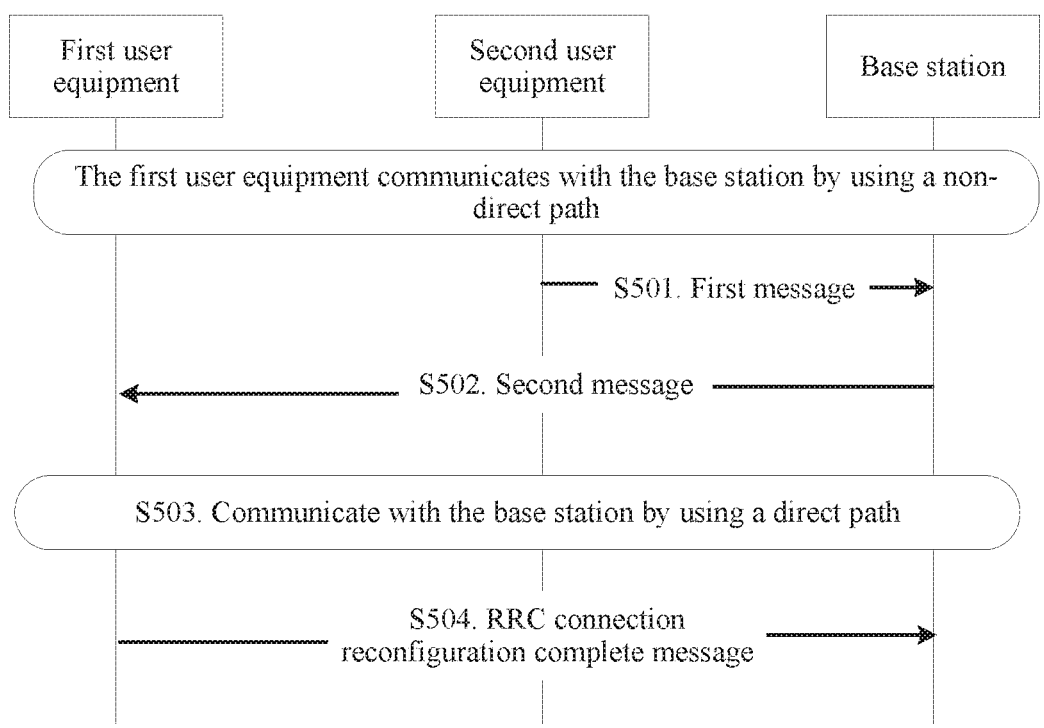
FIG. 5 is a schematic flowchart of another path switching method according to an embodiment of this application.

FIG. 5 is a schematic flowchart of another path switching method according to an embodiment of this application. The method includes but is not limited to the following steps.

S501. First user equipment communicates with a base station by using second user equipment, where the first user equipment and the second user equipment are connected by using a short-range link by using any one of a sidelink of 3GPP, a wireless local area network, and Bluetooth. When the link between the first user equipment and the second user equipment cannot be maintained, for example, because power supply of the second user equipment is insufficient, the second user equipment sends a first message to the base station, where the first message is used to request to release a link connection between the second user equipment and the first user equipment.

After the second user equipment sends the first message to the base station, the base station may release the link connection between the second user equipment and the first user equipment. Alternatively, after the second user equipment sends the first message to the base station, and receives a response message returned by the base station, the second user equipment release the link connection between the second user equipment and the first user equipment.

The first message may include a timing advance. Optionally, the first message further includes a closed-loop power control value currently used by the second user equipment. The timing advance may include an uplink timing advance currently used by the second user equipment, and a length is 11 bits; or may include a receive-transmit time difference (RX_TX time difference) that is of user equipment for a signal frame and that is currently measured by the second user equipment, and a length is 12 bits.

S502. The base station sends a second message to the first user equipment, where the second message is used to instruct the first user equipment to switch from a non-direct path for communicating with the base station by using the second user equipment to a direct path for communicating with the base station, and the second message includes at least one of the timing advance, the closed-loop power control value, and an uplink grant configuration.

S503. The first user equipment performs path switching based on the second message.

During specific implementation, the first user equipment may adjust, based on a value of the timing advance delivered by the base station, a timing advance of a sent uplink physical signal including a physical uplink shared channel to ensure synchronization with the base station, or determine transmit power of a physical uplink shared channel based on the closed-loop power control value delivered by the base station, or determine a sending resource of a physical uplink shared channel based on the uplink grant configuration delivered by the base station. After the foregoing processing, the first user equipment may communicate with the base station by using the direct path.

S504. The first user equipment sends a radio resource control connection reconfiguration complete message to the base station based on at least one of the timing advance, the closed-loop power control value, and the uplink grant configuration.

Specifically, after the first user equipment switches from the non-direct path to the direct path, the base station initiates an RRC connection reconfiguration process to the second user equipment, to release the link connection between the second user equipment and the first user equipment, and reconfigure a data radio bearer between the second user equipment and the base station.

In this embodiment of this application, because the link between the first user equipment and the second user equipment cannot be maintained, the second user equipment sends the first message to the base station, to request to release the link connection between the second user equipment and the first user equipment, and after receiving the first message, the base station sends at least one of the timing advance, the closed-loop power control value, and the uplink grant configuration to the first user equipment, so that the first user equipment completes path switching. Therefore, service continuity is maintained, service quality is improved, and power consumption caused when the first user equipment performs random access is reduced.

Figure 6:
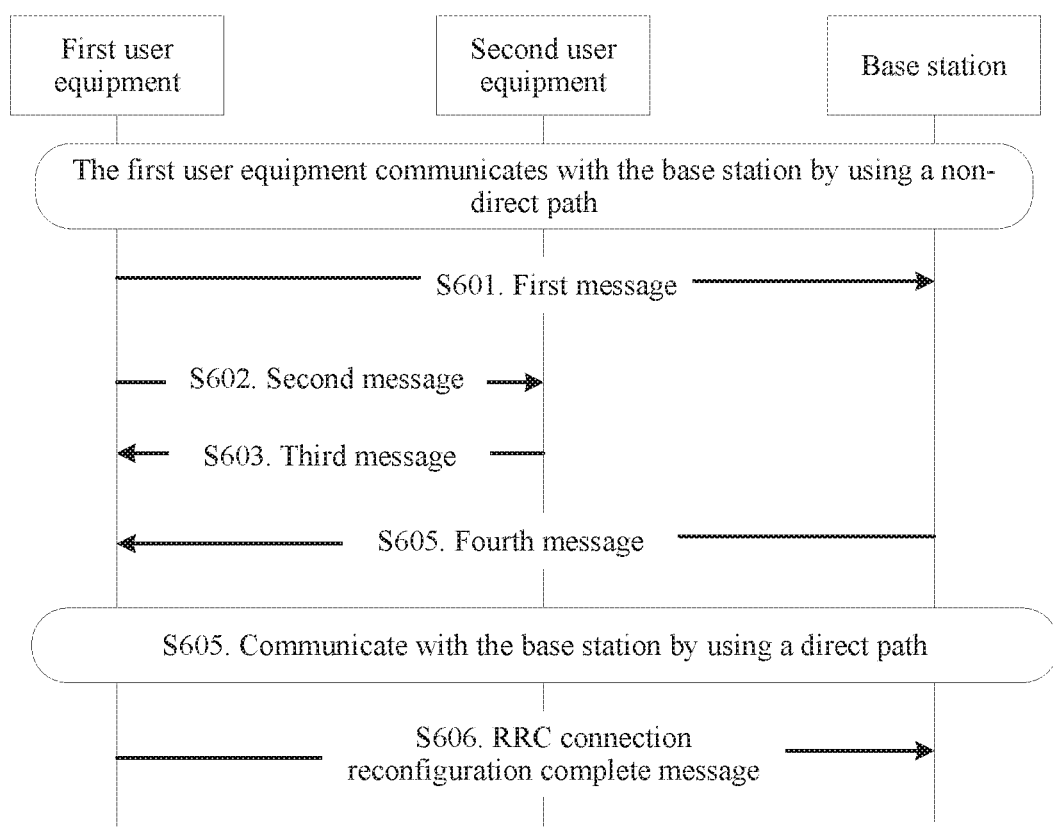
FIG. 6 is a schematic flowchart of another path switching method according to an embodiment of this application.

FIG. 6 is a schematic flowchart of another path switching method according to an embodiment of this application. The method includes but is not limited to the following steps.

S601. First user equipment communicates with a base station by using second user equipment, where the first user equipment and the second user equipment are connected by using a short-range link by using any one of a sidelink of 3GPP, a wireless local area network, and Bluetooth. Due to move of the first user equipment or the second user equipment, the link between the first user equipment and the second user equipment cannot be maintained. The first user equipment may send a first message to the base station, where the first message is used to request to switch the first user equipment from a non-direct path for communicating with the base station by using the second user equipment to a direct path for communicating with the base station.

Optionally, the first message further includes current link quality between the first user equipment and the second user equipment.

S602. The first user equipment sends a second message to the second user equipment. The second message may be used to instruct the second user equipment to return a timing advance. Optionally, the second message may be further used to instruct the second user equipment to return a closed-loop power control value.

S603. The second user equipment sends a third message to the first user equipment, where the third message includes the timing advance. Optionally, the third message further includes a closed-loop power control value currently used by the second user equipment. The timing advance may include an uplink timing advance currently used by the second user equipment, and a length is 11 bits; or may include a receive-transmit time difference (RX_TX time difference) that is of user equipment for a signal frame and that is currently measured by the second user equipment, and a length is 12 bits.

Both the second message and the third message are PC5 signaling. Alternatively, both the second message and the third message are MAC CEs, and a MAC CE format is the same as that in the foregoing embodiment. Details are not described herein again.

S604. The base station sends a fourth message to the first user equipment, where the fourth message is used to instruct the first user equipment to perform path switching, and the second message includes an uplink grant configuration. Optionally, the fourth message further includes a closed-loop power control value preconfigured by the base station.

Optionally, after receiving the first message sent by the first user equipment, the base station determines whether the current link quality between the first user equipment and the second user equipment is greater than a preset threshold; and if the current link quality is greater than the preset threshold, the base station sends the third message to the second user equipment; or if the current link quality is not greater than the preset threshold, the base station does not perform any processing. The first user equipment can use the timing advance of the second user equipment only when the link quality between the first user equipment and the second user equipment is relatively good.

It should be noted that the first user equipment may send the first message, receive the fourth message, send the second message, and receive the third message in any sequence. For example, the first user equipment may first send the first message, and send the second message before receiving the fourth message. For another example, the first user equipment may first send the first message, and send the second message after receiving the fourth message. For another example, the first user equipment may first send the second message, and send the first message before receiving the third message. For another example, the first user equipment may first send the second message, and send the first message after receiving the third message.

S605. The first user equipment performs path switching based on at least one of the timing advance, the closed-loop power control value, and the uplink grant configuration.

During specific implementation, the first user equipment may adjust, based on a value of the timing advance delivered by the second user equipment, a timing advance of a sent uplink physical signal including a physical uplink shared channel to ensure synchronization with the base station, or determine transmit power of a physical uplink shared channel based on the closed-loop power control value sent by the base station or the second user equipment, or determine a sending resource of a physical uplink shared channel based on the uplink grant configuration delivered by the base station. After the foregoing processing, the first user equipment may communicate with the base station by using the direct path.

S606. The first user equipment sends a radio resource control connection reconfiguration complete message to the base station based on at least one of the timing advance, the closed-loop power control value, and the uplink grant configuration.

Specifically, after the first user equipment switches from the non-direct path to the direct path, the base station initiates an RRC connection reconfiguration process to the second user equipment, to release a link connection between the second user equipment and the first user equipment, and reconfigure a data radio bearer between the second user equipment and the base station.

In this embodiment of this application, because the link between the first user equipment and the second user equipment cannot be maintained, the first user equipment sends the first message to the base station, to request to switch the first user equipment from the non-direct path for communicating with the base station by using the second user equipment to the direct path for communicating with the base station, and after receiving the first message, the base station returns the uplink grant configuration and/or the closed-loop power control value to the first user equipment, and the first user equipment obtains the timing advance and/or the closed-loop power control value from the second user equipment, so that the first user equipment completes path switching. Therefore, service continuity is maintained, service quality is improved, and power consumption caused when the first user equipment performs random access is reduced.

Figure 7:
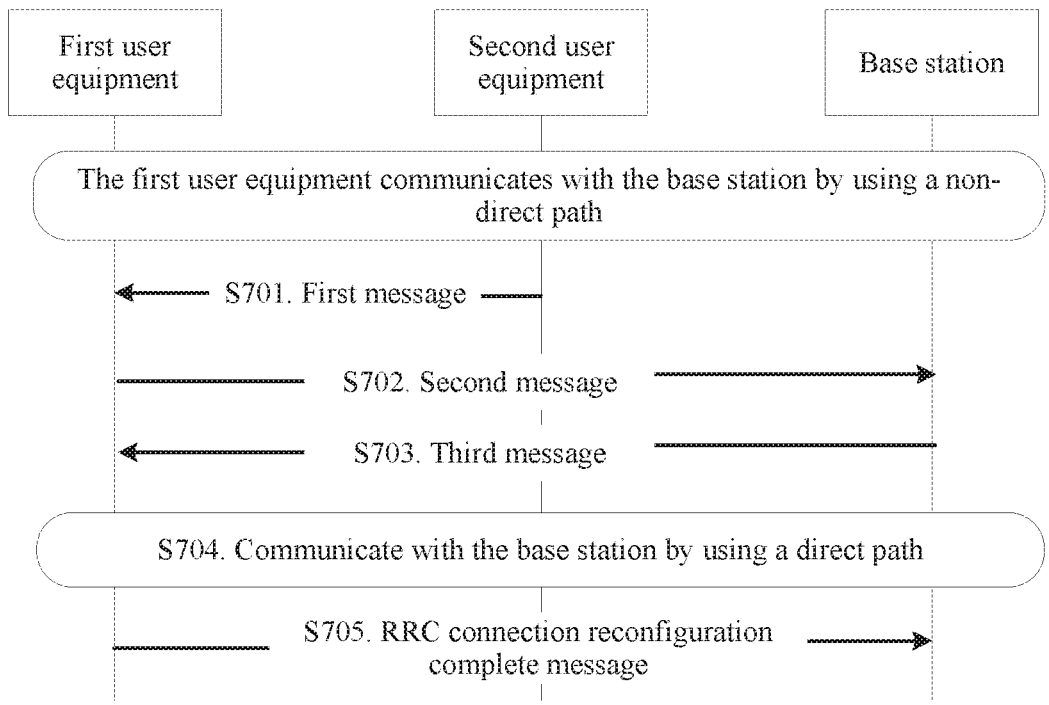
FIG. 7 is a schematic flowchart of another path switching method according to an embodiment of this application.

FIG. 7 is a schematic flowchart of another path switching method according to an embodiment of this application. The method includes but is not limited to the following steps.

S701. First user equipment communicates with a base station by using second user equipment, where the first user equipment and the second user equipment are connected by using a short-range link by using any one of a sidelink of 3GPP, a wireless local area network, and Bluetooth. Because the link between the first user equipment and the second user equipment cannot be maintained, the second user equipment sends a first message to the first user equipment, where the first message is used to notify or instruct the first user equipment to release a link connection between the second user equipment and the first user equipment.

The first message includes a timing advance currently used by the second user equipment. Optionally, the first message further includes a closed-loop power control value currently used by the second user equipment. The timing advance may include an uplink timing advance currently used by the second user equipment, and a length is 11 bits; or may include a receive-transmit time difference (RX_TX time difference) that is of user equipment for a signal frame and that is currently measured by the second user equipment, and a length is 12 bits.

S702. The first user equipment sends a second message to the base station, where the second message is used to request to switch the first user equipment from a non-direct path for communicating with the base station by using the second user equipment to a direct path for communicating with the base station. The second message includes indication information, and the indication information is used to indicate that the first user equipment has obtained the timing advance or indicate that the first user equipment has obtained the timing advance and the closed-loop power control value.

S703. The base station sends a third message to the first user equipment, where the third message includes an uplink grant configuration. Optionally, the third message further includes a closed-loop power control value preconfigured by the base station.

S704. The first user equipment performs path switching based on at least one of the timing advance, the closed-loop power control value, and the uplink grant configuration.

During specific implementation, the first user equipment may adjust, based on a value of the timing advance delivered by the second user equipment, a timing advance of a sent uplink physical signal including a physical uplink shared channel to ensure synchronization with the base station, or determine transmit power of a physical uplink shared channel based on the closed-loop power control value sent by the base station or the second user equipment, or determine a sending resource of a physical uplink shared channel based on the uplink grant configuration delivered by the base station. After the foregoing processing, the first user equipment may communicate with the base station by using the direct path.

S705. The first user equipment sends a radio resource control connection reconfiguration complete message to the base station based on at least one of the timing advance, the closed-loop power control value, and the uplink grant configuration.

Specifically, after the first user equipment switches from the non-direct path to the direct path, the base station initiates an RRC connection reconfiguration process to the second user equipment, to release the link connection between the second user equipment and the first user equipment, and reconfigure a data radio bearer between the second user equipment and the base station.

In this embodiment of this application, because the link between the first user equipment and the second user equipment cannot be maintained, first the second user equipment sends the first message to the first user equipment. The first user equipment obtains the timing advance and/or the closed-loop power control value, and then the first user equipment sends the second message to the base station. After the base station returns the third message, the first user equipment obtains the uplink grant configuration and/or the closed-loop power control value, so that the first user equipment completes path switching. Therefore, service continuity is maintained, service quality is improved, and power consumption caused when the first user equipment performs random access is reduced.

The method in the embodiments of this application is described in detail above, and the following provides an apparatus according to an embodiment of this application.

Figure 8:
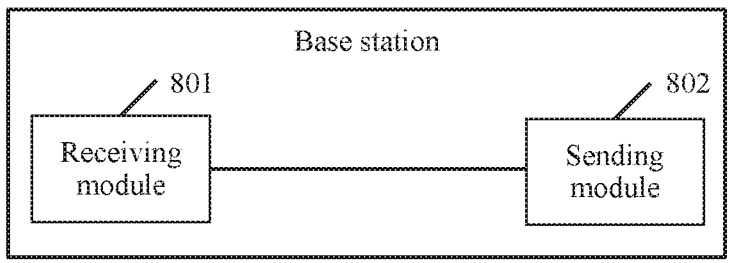
FIG. 8 is a schematic structural diagram of a base station according to an embodiment of this application.

FIG. 8 is a schematic structural diagram of a base station according to an embodiment of this application. The base station may include a receiving module 801 and a sending module 802. Detailed descriptions of the modules are as follows.

In an embodiment of this application, the receiving module 801 is configured to receive a first message sent by first user equipment, where the first message is used to request to switch the first user equipment from a non-direct path for communicating with the base station by using second user equipment to a direct path for communicating with the base station. The sending module 802 is configured to send a second message to the first user equipment, where the second message is used to instruct the first user equipment to perform path switching, and the second message includes at least one of a timing advance, a closed-loop power control value, and an uplink grant configuration.

Optionally, the sending module 802 is further configured to send a third message to the second user equipment, where the third message is used to instruct the second user equipment to report the timing advance. The receiving module 801 is further configured to receive a fourth message sent by the second user equipment, where the fourth message includes the timing advance.

Optionally, the sending module 802 is further configured to send a fifth message to the second user equipment, where the fifth message is used to instruct the second user equipment to report the closed-loop power control value.

Optionally, the receiving module 801 is further configured to receive a sixth message sent by the second user equipment, where the sixth message includes the closed-loop power control value.

Optionally, the receiving module 801 is further configured to receive a radio resource control connection reconfiguration complete message sent by the first user equipment, and the radio resource control connection reconfiguration complete message is sent by the first user equipment based on at least one of the timing advance, the closed-loop power control value, and the uplink grant configuration.

In another embodiment of this application, the receiving module 801 is configured to receive a first message sent by second user equipment, where the first message is used to request to release a link connection between the second user equipment and first user equipment. The sending module 802 is configured to send a second message to the first user equipment, where the second message is used to instruct the first user equipment to switch from a non-direct path for communicating with the base station by using the second user equipment to a direct path for communicating with the base station, and the second message includes at least one of a timing advance, a closed-loop power control value, and an uplink grant configuration.

Optionally, the receiving module 801 is further configured to receive a radio resource control connection reconfiguration complete message sent by the first user equipment, and the radio resource control connection reconfiguration complete message is sent by the first user equipment based on at least one of the timing advance, the closed-loop power control value, and the uplink grant configuration.

It should be noted that, for implementation of the modules, further refer to corresponding descriptions of the method embodiments shown in FIG. 3, FIG. 5, FIG. 6, and FIG. 7, to perform methods and functions performed by the base station in the foregoing embodiments.

Figure 9:
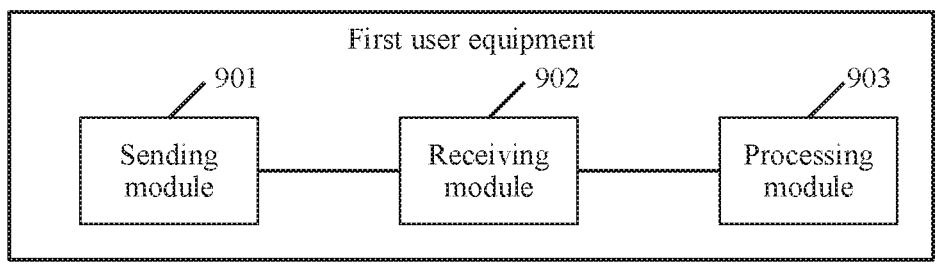
FIG. 9 is a schematic structural diagram of first user equipment according to an embodiment of this application.

FIG. 9 is a schematic structural diagram of first user equipment according to an embodiment of this application. The first user equipment may include a sending module 901, a receiving module 902, and a processing module 903. Detailed descriptions of the modules are as follows.

In an embodiment of this application, the sending module 901 is configured to send a first message to a base station, where the first message is used to request to switch the first user equipment from a non-direct path for communicating with the base station by using second user equipment to a direct path for communicating with the base station. The receiving module 902 is configured to receive a second message sent by the base station, where the second message includes at least one of a timing advance, a closed-loop power control value, and an uplink grant configuration. The processing module 903 is configured to perform path switching based on the second message.

Optionally, the sending module 901 is further configured to send a radio resource control connection reconfiguration complete message to the base station based on at least one of the timing advance, the closed-loop power control value, and the uplink grant configuration.

In an embodiment of this application, the receiving module 902 is configured to receive a second message sent by a base station, where the second message is sent by the base station after the base station receives a first message sent by second user equipment, the first message is used to request to release a link connection between the second user equipment and the first user equipment, and the second message includes at least one of a timing advance, a closed-loop power control value, and an uplink grant configuration. The processing module 903 is configured to switch, based on the second message, from a non-direct path for communicating with the base station by using the second user equipment to a direct path for communicating with the base station.

Optionally, the sending module 901 is further configured to send a radio resource control connection reconfiguration complete message to the base station based on at least one of the timing advance, the closed-loop power control value, and the uplink grant configuration.

It should be noted that, for implementation of the modules, further refer to corresponding descriptions of the method embodiments shown in FIG. 3, FIG. 5, FIG. 6, and FIG. 7, to perform methods and functions performed by the first user equipment in the foregoing embodiments.

Figure 10:
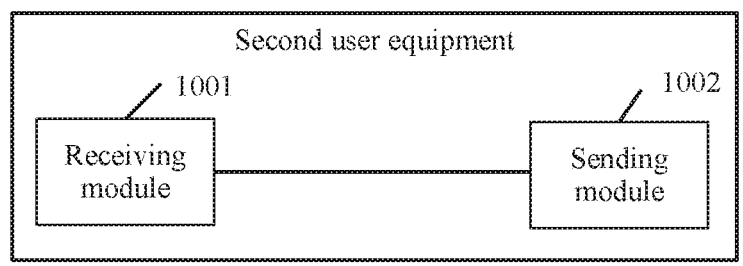
FIG. 10 is a schematic structural diagram of second user equipment according to an embodiment of this application.

FIG. 10 is a schematic structural diagram of second user equipment according to an embodiment of this application. The first user equipment may include a sending module 1001, a receiving module 1002. Detailed descriptions of the modules are as follows.

The receiving module 1001 is configured to receive a third message sent by a base station, where the third message is used to instruct the second user equipment to report a timing advance.

The sending module 1002 is configured to send a fourth message to the base station, where the fourth message includes the timing advance of the second user equipment.

Optionally, the receiving module 1001 is further configured to receive a fifth message sent by the base station, where the fifth message is used to instruct the second user equipment to report a closed-loop power control value. The sending module 1002 is further configured to send a sixth message to the base station, where the sixth message includes the closed-loop power control value of the second user equipment.

It should be noted that, for implementation of the modules, further refer to corresponding descriptions of the method embodiments shown in FIG. 3, FIG. 5, FIG. 6, and FIG. 7, to perform methods and functions performed by the second user equipment in the foregoing embodiments.

Figure 11:
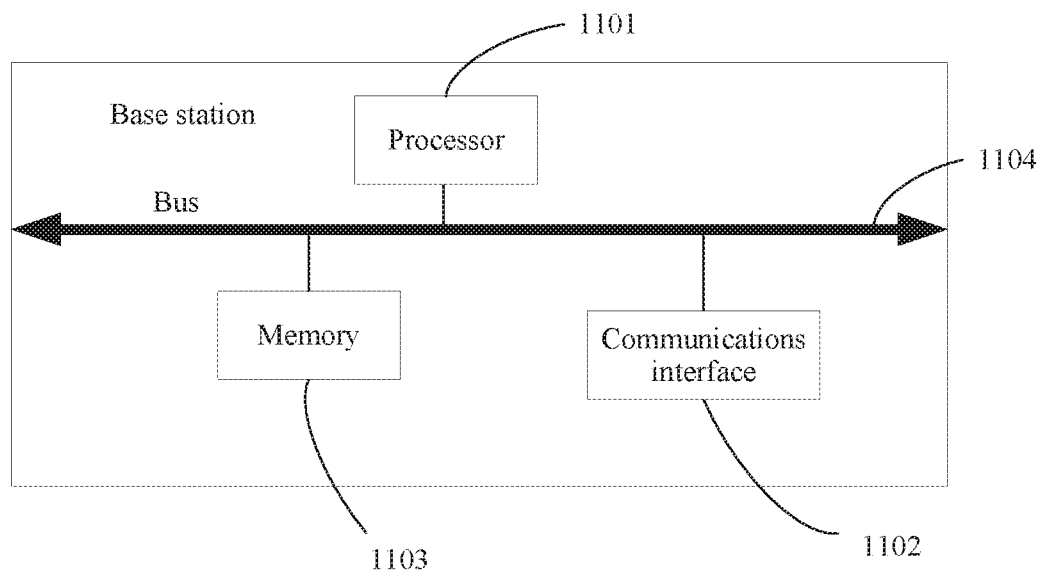
FIG. 11 is a schematic structural diagram of another base station according to this application.

FIG. 11 is a schematic structural diagram of another base station according to this application. As shown in the figure, the base station may include at least one processor 1101 such as a CPU, at least one communications interface 1102, at least one memory 1103, and at least one communications bus 1104. The communications bus 1104 is configured to implement connection communication between these components. The communications interface 1102 in the device in this embodiment of this application is configured to perform signaling or data communication with another node device. The memory 1103 may be a high-speed RAM memory, or may be a non-volatile memory (non-volatile memory) such as at least one magnetic disk storage. Optionally, the memory 1103 may be at least one storage apparatus far away from the processor 1101. The memory 1103 stores a group of program code, and the processor 1101 executes a program that is in the memory 1103 and that is executed by the base station. Further, the processor may further cooperate with the memory and the communications interface to perform operations of the base station in the foregoing embodiments of this application.

Figure 12:
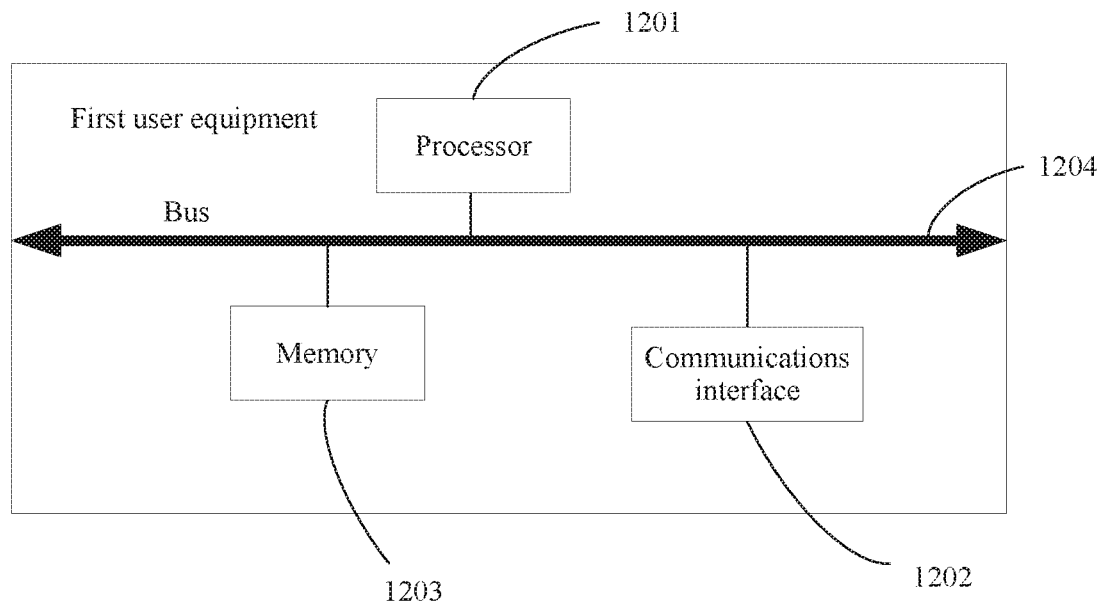
FIG. 12 is a schematic structural diagram of another first user equipment according to this application.

FIG. 12 is a schematic structural diagram of another user equipment according to this application. As shown in the figure, the first user equipment may include at least one processor 1201 such as a CPU, at least one communications interface 1202, at least one memory 1203, and at least one communications bus 1204. The communications bus 1204 is configured to implement connection communication between these components. The communications interface 1202 in the device in this embodiment of this application is configured to perform signaling or data communication with another node device. The memory 1203 may be a high-speed RAM memory, or may be a non-volatile memory (non-volatile memory) such as at least one magnetic disk storage. Optionally, the memory 1203 may be at least one storage apparatus far away from the processor 1201. The memory 1203 stores a group of program code, and the processor 1201 executes a program that is in the memory 1203 and that is executed by the first user equipment. Further, the processor may further cooperate with the memory and the communications interface to perform operations of the first user equipment in the foregoing embodiments of this application.

Figure 13:
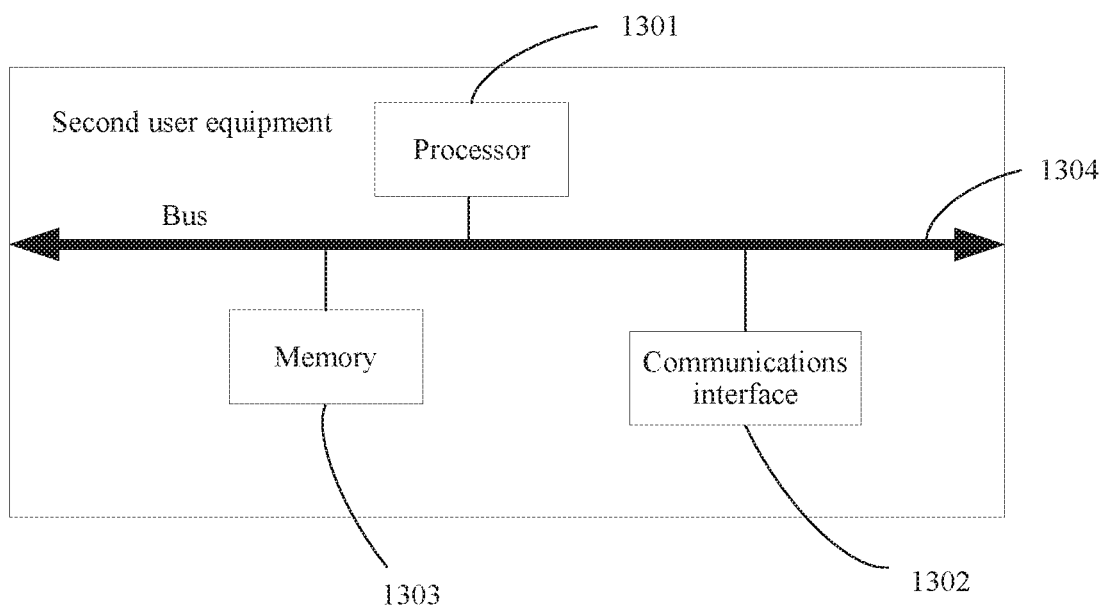
FIG. 13 is a schematic structural diagram of another second user equipment according to this application.

FIG. 13 is a schematic structural diagram of another user equipment according to this application. As shown in the figure, the second user equipment may include at least one processor 1301 such as a CPU, at least one communications interface 1302, at least one memory 1303, and at least one communications bus 1304. The communications bus 1304 is configured to implement connection communication between these components. The communications interface 1302 in the device in this embodiment of this application is configured to perform signaling or data communication with another node device. The memory 1303 may be a high-speed RAM memory, or may be a non-volatile memory (non-volatile memory) such as at least one magnetic disk storage. Optionally, the memory 1303 may be at least one storage apparatus far away from the processor 1301. The memory 1303 stores a group of program code, and the processor 1301 executes a program that is in the memory 1303 and that is executed by the second user equipment. Further, the processor may further cooperate with the memory and the communications interface to perform operations of the second user equipment in the foregoing embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center wiredly (for example, a coaxial cable, an optical fiber, or a digital subscriber line (DSL)) or wirelessly (for example, infrared, radio, and microwave). The computer-readable storage medium may be any usable medium accessible to a computer, or a data storage device such as a server or a data center integrated with one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

What is claimed is:

1. A path switching method implemented by a base station, comprising:

receiving a first message from a first user equipment, wherein the first message requests to switch the first user equipment from a non-direct path for communicating with the base station using a second user equipment to a direct path for communicating with the base station;

sending a second message to the first user equipment, wherein the second message instructs the first user equipment to perform path switching, and wherein the second message comprises at least one of a timing advance, a closed-loop power control value, or an uplink grant configuration; and when the second message comprises a closed-loop power control value, sending an instruction to the second user equipment to report the closed-loop power control value.

2. The path switching method of claim 1, wherein before sending the second message, the path switching method further comprises:

sending a third message to the second user equipment, wherein the third message instructs the second user equipment to report the timing advance; and receiving a fourth message from the second user equipment, wherein the fourth message comprises the timing advance.

3. The path switching method of claim 1, further comprising:

sending a fifth message to the second user equipment, wherein the fifth message instructs the second user equipment to report the closed-loop power control value; and receiving a sixth message from the second user equipment, wherein the sixth message comprises the closed-loop power control value.

4. The path switching method of claim 1, wherein after sending the second message, the path switching method further comprises receiving a radio resource control connection reconfiguration complete message from the first user equipment.

5. The path switching method of claim 1, wherein before sending the second message, the path switching method further comprises:

determining that a current link quality between the first user equipment and the second user equipment is greater than a preset threshold; and sending, in response to the determining, a third message comprising a timing advance.

6. The path switching method of claim 1, wherein before sending the second message, the path switching method further comprises:

determining that a current link quality between the first user equipment and the second user equipment is less than or equal to a preset threshold; and disregarding, in response to the determining, the first message.

7. The path switching method of claim 1, wherein after sending the second message, the path switching method further comprises receiving a radio resource control connection reconfiguration complete message from the first user equipment based on the closed-loop power control value.

8. The path switching method of claim 1, wherein after sending the second message, the path switching method further comprises receiving a radio resource control connection reconfiguration complete message from the first user equipment based on the uplink grant configuration.

9. A path switching method implemented by a base station, comprising:

receiving a first message from a second user equipment, wherein the first message requests to release a link connection between the second user equipment and a first user equipment;

sending a second message to the first user equipment, wherein the second message instructs the first user equipment to switch from a non-direct path for communicating with the base station using the second user equipment to a direct path for communicating with the base station, and wherein the second message comprises at least one of a timing advance, a closed-loop power control value, or an uplink grant configuration; and when the second message comprises a closed-loop power control value, receiving a radio resource control connection reconfiguration complete message from the first user equipment based on the closed-loop power control value.

10. The path switching method of claim 9, wherein the first message comprises the timing advance.

11. The path switching method of claim 9, wherein the first message further comprises the closed-loop power control value.

12. The path switching method of claim 9, wherein after sending the second message, the path switching method further comprises receiving a radio resource control connection reconfiguration complete message from the first user equipment based on the timing advance.

13. The path switching method of claim 9, wherein after sending the second message, the path switching method further comprises receiving a radio resource control connection reconfiguration complete message from the first user equipment based on the closed-loop power control value.

14. The path switching method of claim 9, wherein after sending the second message, the path switching method further comprises receiving a radio resource control connection reconfiguration complete message from the first user equipment, and wherein the radio resource control connection reconfiguration complete message is received from the first user equipment based on the uplink grant configuration.

15. A path switching method implemented by a first user equipment, comprising:

receiving a second message from a base station after the base station receives a first message from a second user equipment, wherein the first message requests to release a link connection between the second user equipment and the first user equipment, and wherein the second message comprises at least one of a timing advance, a closed-loop power control value, or an uplink grant configuration;

switching, based on the second message, from a non-direct path for communicating with the base station using the second user equipment to a direct path for communicating with the base station, and when the second message comprises a closed-loop power control value, sending a radio resource control connection reconfiguration complete message to the base station based on the closed-loop power control value.

16. The path switching method of claim 15, wherein the first message comprises the timing advance.

17. The path switching method of claim 15, wherein the first message further comprises the closed-loop power control value.

18. The path switching method of claim 15, wherein after switching from the non-direct path to the direct path, the path switching method further comprises sending a radio resource control connection reconfiguration complete message to the base station based on the timing advance.

19. The path switching method of claim 15, wherein after switching from the non-direct path to the direct path, the path switching method further comprises sending a radio resource control connection reconfiguration complete message to the base station based on the uplink grant configuration.

20. The path switching method of claim 15, wherein the second message comprises the uplink grant configuration.

* * * * *